(12) United States Patent
Xiao et al.

(10) Patent No.: US 10,343,559 B2
(45) Date of Patent: Jul. 9, 2019

(54) INTERIOR COMPARTMENT OF AN AUTONOMOUS VEHICLE

(71) Applicant: Pony.ai, Inc., Fremont, CA (US)

(72) Inventors: Sinan Xiao, Fremont, CA (US); Zhuo Zhang, Fremont, CA (US); Xiang Yu, Santa Clara, CA (US); Tiancheng Lou, Milpitas, CA (US); Jun Peng, Fremont, CA (US); Hao Song, Sunnyvale, CA (US); Jie Hou, San Francisco, CA (US); Yiming Liu, San Jose, CA (US)

(73) Assignee: Pony.ai, Inc., Fremont, CA (US)

( * ) Notice: Subject to any disclaimer, the term of this patent is extended or adjusted under 35 U.S.C. 154(b) by 0 days.

(21) Appl. No.: 15/839,316

(22) Filed: Dec. 12, 2017

(65) Prior Publication Data

US 2019/0176660 A1   Jun. 13, 2019

(51) Int. Cl.
| | | |
|---|---|---|
| *G05D 1/00* | (2006.01) |
| *B60N 2/24* | (2006.01) |
| *B62D 1/24* | (2006.01) |
| *B60N 3/00* | (2006.01) |
| *B60R 11/02* | (2006.01) |

(52) U.S. Cl.
CPC ............. *B60N 2/24* (2013.01); *B60N 3/001* (2013.01); *B60R 11/0235* (2013.01); *B62D 1/24* (2013.01); *G05D 1/0088* (2013.01); *G05D 1/0061* (2013.01); *G05D 2201/0212* (2013.01)

(58) Field of Classification Search
CPC ...... B62D 1/24; G05D 1/0088; G05D 1/0061; G05D 2201/0212
See application file for complete search history.

(56) References Cited

U.S. PATENT DOCUMENTS

| | | | |
|---|---|---|---|
| 4,201,415 A * | 5/1980 | Suchanek | B60K 11/00 180/68.1 |
| 5,170,352 A | 12/1992 | McTamaney et al. | |
| 8,364,334 B2 | 1/2013 | Au et al. | |
| 2016/0129908 A1* | 5/2016 | Harda | G05D 1/0088 701/24 |
| 2016/0200344 A1* | 7/2016 | Sugioka | B62D 1/183 74/493 |
| 2016/0325757 A1* | 11/2016 | Westlund | B60W 50/082 |
| 2017/0021765 A1* | 1/2017 | Mori | B60Q 9/00 |

(Continued)

OTHER PUBLICATIONS https://www.computerhistory.org/atchm/where-to-a-history-of-autonomous-vehicles/ (Year: 2014).*

(Continued)

*Primary Examiner* — Hilary L Gutman
(74) *Attorney, Agent, or Firm* — Sheppard Mullin Richter & Hampton LLP

(57) ABSTRACT

Embodiments disclosed herein are directed to autonomous vehicles comprising at least one interior compartment including: at least one table; at least one seating unit; at least one closet; at least one window configured to transition between a substantially transparent state and a substantially opaque state and to display at least navigational information; at least one vanity; at least one storage area; or combinations thereof; wherein the vehicle is configured to operate in at least an autonomous mode. In some instance, the vehicle may not include steering equipment (e.g., steering wheel) and/or acceleration or deceleration equipment (e.g., a gas or brake pedal).

10 Claims, 3 Drawing Sheets

(56) References Cited

U.S. PATENT DOCUMENTS

2017/0101080 A1* 4/2017 Brannstrom .......... B60W 50/08
2017/0132916 A1* 5/2017 Ioli ....................... G08G 1/012

OTHER PUBLICATIONS https://www.digitaltrends.com/cars/history-of-self-driving-cars-milestones/ (Year: 2019).*
https://en.wikipedia.org/wiki/History_of_self-driving_cars (Year: 2019).*
http://www.ipwatchdog.com/2016/04/07/autonomous-cars-patents-perspectives/id=68045/ (Year: 2016).*
https://www.electronicdesign.com/automotive/automakers-tech-companies-unite-spread-word-about-self-driving (Year: 2019).*

* cited by examiner

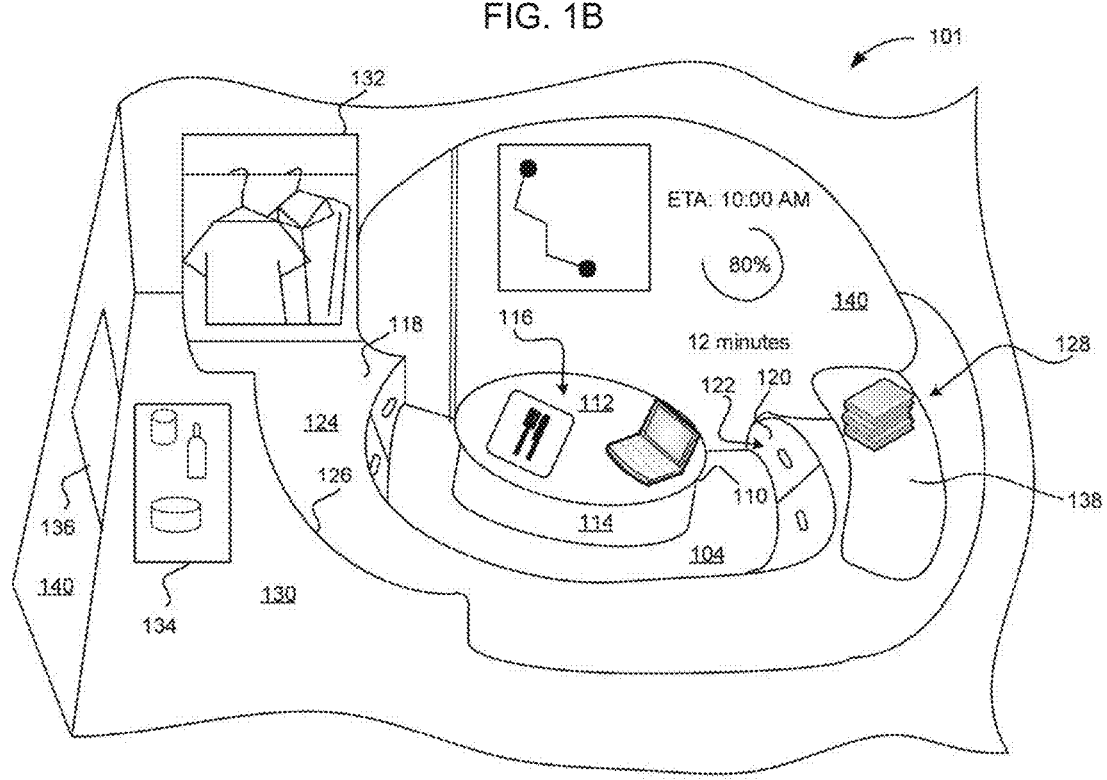
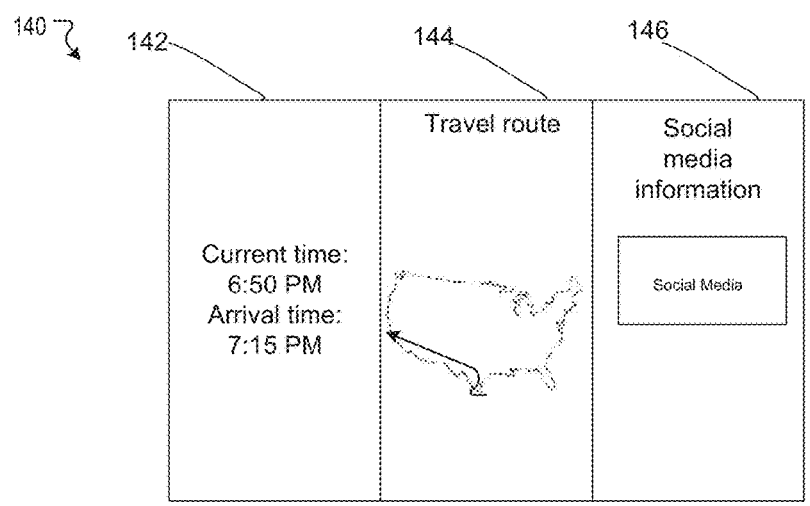

INTERIOR COMPARTMENT OF AN AUTONOMOUS VEHICLE

BACKGROUND

Conventional vehicles typically require real time human input to control the operation thereof. It is often dangerous, or even illegal, to engage in other activities while navigating and controlling such vehicles. Accordingly, such activities (e.g., dressing, eating, etc.) need to be performed prior to, or after, the actual commute (travel time) to a work or personal engagement. The inability to combine such activities safely and comfortably during the commute with convention vehicle technology, is both inconvenient and inefficient.

These and other issues are addressed, resolved, and/or reduced using the systems, techniques, and vehicles described herein.

SUMMARY

Described herein are unique and customizable systems, components, and interior compartments associated with an autonomous vehicle.

Accordingly, in one embodiment, the present disclosure provides a vehicle comprising at least one interior compartment, wherein the interior compartment comprises one or more components selected from: at least one table; at least one seating unit; at least one closet; at least one window; at least one vanity; at least one storage area; and combinations thereof; wherein the vehicle is configured to operate at least in an autonomous mode.

In some embodiments, the vehicle does not comprise a steering wheel. In some embodiments, the vehicle does not comprise an acceleration pedal or a brake pedal. In some embodiments, the at least one window is configured to transition between a substantially transparent state and a substantially opaque state.

In some embodiments, the at least one window is configured to display information on at least a portion thereof, wherein the information comprises navigational information. In some embodiments, the navigational information comprises a time of arrival to a destination, a suggested route to the destination, current traffic information, or current road condition information, or combinations thereof.

In some embodiments, the information comprises social media content. In some embodiments, the vehicle is further configured to operate in a manual mode. In some embodiments, the vehicle is further configured to operate in an emergency mode. In some embodiments, the interior compartment comprises each of the at least one table; the at least one seating unit; the at least one closet; the at least one window; the at least one vanity; and the at least one storage area.

BRIEF DESCRIPTION OF THE DRAWINGS

Exemplary and non-limiting embodiments of the inventions may be more readily understood by referring to the accompanying drawings, in which:

FIGS. 1A and 1B are schematic diagrams of an autonomous vehicle and an interior compartment thereof, in accordance with one embodiment.

DETAILED DESCRIPTION

Figure 1A:
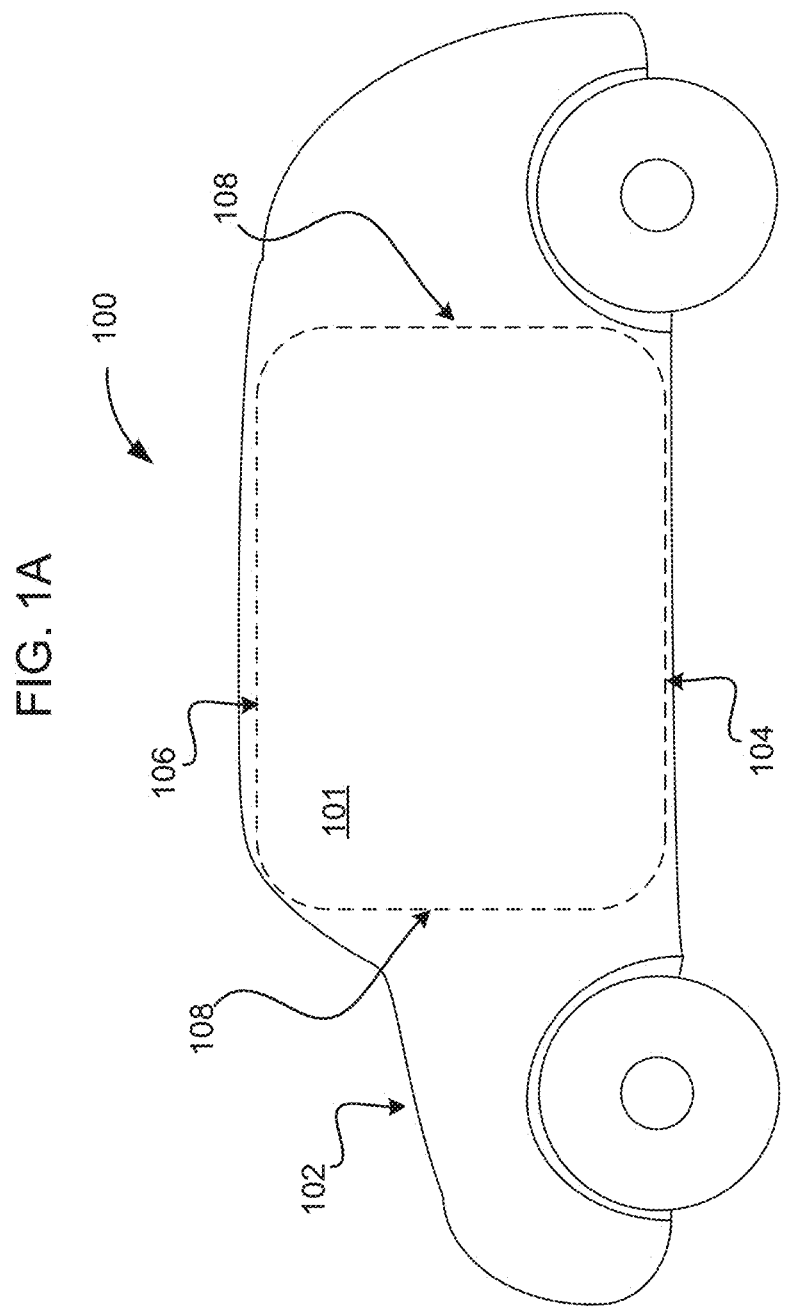

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless otherwise defined, all technical and scientific terms used herein have the same meaning as commonly understood by one of ordinary skill in the art to which this invention belongs.

Throughout the present specification and claims, unless the context requires otherwise, the word "comprise" and variations thereof (e.g., "comprises" and "comprising") are to be construed in an open, inclusive sense, that is as "including, but not limited to." Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Recitation of numeric ranges of values throughout the specification is intended to serve as a shorthand notation of referring individually to each separate value falling within the range inclusive of the values defining the range, and each separate value is incorporated in the specification as it were individually recited herein.

Reference to "about" a value or parameter herein includes (and describes) embodiments that are directed to that value or parameter per se. In some embodiments, the term "about" includes the indicated amount ±10%.

In addition, where features or aspects of the invention are described in terms of Markush groups, those skilled in the art will recognize that the invention is also thereby described in terms of any individual member or subgroup of members of the Markush group.

The commute time for individuals to go to work or attend business or personal engagements has steadily increased due to, for example, increasing urban populations, problems related with current infrastructure, etc. Individuals further need to factor the time required to prepare (e.g., dress, eat, etc.) for such business or personal engagements into the overall commute (travel) time. Current vehicle technology does not allow for individuals to combine this preparation time/routine during the actual commute (travel) to work, as real time human input is needed to control the vehicle.

Accordingly, provided herein are unique and customizable systems, components, and vehicles associated with self-driving (autonomous) vehicle technology that enables individuals to multitask (e.g., dress, eat, read, sleep, etc.) during the commute to a work or personal engagement. For instance, various embodiments described herein are directed to autonomous vehicles comprising one or more unique interior compartments that allow combination of the aforementioned "preparation" routine (e.g., dressing, eating, etc.) with the actual commute (travel) time. Further, the ability of an autonomous vehicle to operate with limited or no real time human input, and even eliminate steering equipment (e.g., steering wheel) and/or acceleration/deceleration equipment (e.g., gas/brake pedal) in some instances, enables the interior of said vehicle to be uniquely designed and configured. Indeed, as described in exemplary embodiments herein, the autonomous vehicles of the present invention may effectively function as a dressing room, office, bedroom, etc., that may be utilized while the vehicle is in motion and operating in an autonomous mode.

Referring now to FIGS. 1A-1B, side views of an autonomous vehicle 100 and at least one interior compartment 101 thereof is shown in accordance with one embodiment. The autonomous vehicle 100 and interior compartment 101 thereof may be implemented in combination with, or as an alternative to, other devices/features/components described herein, such as those described with reference to other embodiments and FIGS. The autonomous vehicle 100 and interior compartment 101 thereof may additionally be utilized in any of the methods for using such devices/components/features described herein. The autonomous vehicle 100 and interior compartment 101 thereof may also be used in various applications and/or in permutations, which may or may not be noted in the illustrative embodiments described herein. For instance, the autonomous vehicle 100 and interior compartment 101 thereof may include more or less features/components than those shown in FIGS. 1A-1B, in some embodiments. Moreover, The autonomous vehicle 100 and interior compartment 101 thereof is not limited to the size, shape, number of components, configuration, etc. specifically shown in FIGS. 1A-1B.

As shown in the simplified schematic of FIG. 1A, the autonomous vehicle comprises a movable body/frame 102. The "vehicle" discussed in this paper typically includes a vehicle that drives on the ground, and may also include a vehicle that flies in the sky (e.g., drones, helicopter, airplanes, and so on). The "vehicle" discussed in this paper may additionally accommodate one or more passengers therein.

In some embodiments, the autonomous vehicle 100 may be configured to operate in various operational modes. One such operational mode may be a manual mode in which the vehicle is configured to operate primarily via real time input human input (as in the case of conventional, non-autonomous vehicles). "Real time human input" is intended to represent a human input that is needed to concurrently control wheel movement of a non-self-driving vehicle, such as gear shifting, steering control, braking pedal control, accel pedal control, crutch pedal control, and so on.

Another such operational mode may be a first autonomous mode in which the vehicle is operated with little to no real time human input. Yet another such operational mode may be a second autonomous mode in which the vehicle is operated with little to no real time human input, and the operating conditions of the vehicle are optimized based on passenger input. Such operating conditions may include, but are not limited to, the speed of the vehicle, the type of the road selected for travel (e.g., a highway, freeway, city streets, side-roads, etc.), the trajectory of the route (e.g., substantially straight or windy type route, etc.), the lane in which the vehicle is moving, and/or the conditions of the road selected for travel (e.g., paving conditions of the road, presence of construction, etc.). As discussed in greater detail below, the unique autonomous vehicle 100 and interior compartment 101 thereof enable a passenger to engage in activities (e.g., dressing, eating, sleeping, etc.) that would otherwise not be possible in conventional vehicles. Accordingly, a passenger within the interior compartment 101 of the autonomous vehicle 100 may be in the process of dressing, eating, or sleeping, and select the second autonomous mode to ensure that the vehicle minimizes disturbances (e.g., travels 5 to 10 mph slower than the respective speed limit, travels in the rightmost lane when appropriate, avoids routes known to be under construction, etc.) while the passenger is engaged in any of the aforementioned activities.

A further operational mode may be an emergency mode in which the vehicle is configured to handle, with little to no human input, an emergency situation (e.g., a traffic accident, natural disaster, etc.) by diverting the vehicle away from the location of the emergency situation.

In some embodiments, the operational modes may be selected based on human input. For instance, a passenger in the autonomous vehicle 100 may selected a particular operation mode by, e.g., pressing a button, speaking a particular voice command, etc. In some embodiments, the operation modes may be selected by the autonomous vehicle 100 based on one or more predetermined parameters. For instance, the autonomous vehicle 100 may be configured to switch to the emergency mode upon detecting certain objects by one or more cameras and/or sensors coupled to the vehicle, and/or upon receiving information about an emergency situation impacting a current travel route from other vehicles, traffic systems, servers, etc. operatively coupled via a network (e.g., comprising wired communication interfaces and wireless communication interfaces for communicating over wired or wireless communication channels).

While not shown in FIG. 1A, the autonomous vehicle 100 may comprise one or more imaging devices (e.g., cameras), sensors, navigations systems, radar systems, lidar systems, communication systems, Global Positioning System (GPS) receivers, etc., each of which may be operatively coupled to an exterior and/or interior portion of the vehicle 100.

While also not shown in FIG. 1A, the autonomous vehicle 100 may comprise at least one control engine. In some embodiments, this control engine comprises specifically-purposed hardware and software configured to control overall operation of the autonomous vehicle 100. The autonomous vehicle 100 may also include one or more additional engines, each configured to control operation of a specific component or a set of specific components associated with the vehicle 100. These additional engines may include, but are not limited to, an image processing engine, a positioning engine, a communication engine, an operational mode engine, etc.

An image processing engine, when present, may comprise specifically-purposed hardware and software configured to carry out image processing of image data of scene images generated by imaging devices (not shown) coupled to the autonomous vehicle 100. In a specific example, the scene images include road signs, traffic signals, lane lines, other vehicles, pedestrians, buildings, and so on. In an embodiment, the image processing engine may be configured to detect objects included in each of the scene images. In a specific example, the image processing engine may detect objects based on a contour line (high contrast region) included in the scene images. In some embodiments, the image processing engine may be configured to identify each object included in the scene images based on image processing of the image data thereof, in accordance with an image recognition technique. For example, according to an image recognition technique, the image processing engine may compare image data of each of the detected objects with image data of reference objects that are stored in advance, for example, in the autonomous vehicle 100 or at an external server in communication with said vehicle for identification of the detected objects. For the image recognition, an applicable machine learning technology (including deep learning) may be employed in a specific implementation. In some embodiments, the image processing engine may be configured to generate processed image data and provide the processed image data to the control engine.

The positioning engine, when present, may comprise specifically-purposed hardware and software configured to determine absolute position and orientation of the autonomous vehicle 100 itself and the detected objects. In some embodiments, the positioning engine may determine absolute position and orientation of the autonomous vehicle 100 based on an inputs from sensors, including a global positioning system (GPS), a gyro sensor, an acceleration sensor, and so on. In some embodiments, the positioning engine may determine absolute position and orientation of one or more detected objects based on the input from the sensors and the relative position obtained based on the image processing.

The communication engine, when present, may comprise specifically-purposed hardware and software configured to carry out communication through output devices (e.g., speakers, displays, etc.) directly coupled to the autonomous vehicle 100, and/or communication with other vehicles, traffic systems, servers, etc. operatively coupled via a network.

An operational mode engine, when present, may comprise specifically-purposed hardware and software configured to implement a particular operation mode, e.g., as described herein.

With continued reference to FIG. 1A, the autonomous vehicle 100 may comprise at least one interior compartment 101 located within the movable body 102. In some embodiments, the at least one interior compartment 101 may comprise about 20% to about 100% of the interior area of the autonomous vehicle 100. In some embodiments, the at least one interior compartment 101 may comprise at least about 50%, at least about 60%, at least about 70%, at least about 80%, at least about 90%, or at least about 95% of interior area of the autonomous vehicle 100.

As shown in FIG. 1A, the interior component 100 may comprise a floor region 104 in spaced relation with a roof region 106, and a sidewall region 108 extending therebetween. It is of note that the interior components located within the space defined by the roof, floor, and sidewall regions 104, 106, 108 are omitted in FIG. 1A for clarity.

In some embodiments, the floor and roof regions 104, 106 may be substantially parallel to one another. In some embodiments, the floor and roof regions 104, 106 may not be substantially parallel to one another, e.g., one or more portions of the roof region 106 may be oriented at a predetermined angle relative to the floor region 104. In some embodiments, the roof region 106 may comprise one or more convex portions. In some embodiments, the roof region 106 may comprise one or more concave portions.

In some embodiments, the sidewall region 108 may extend in a substantially vertical fashion between the floor and roof regions 104, 106. In some embodiments, however, the sidewall region 108 may comprise one or more convex portions. In some embodiments, the sidewall region 108 may comprise one or more concave portions.

In some embodiments, one or more portions of the sidewall region 108 may coincide with the respective region of the movable body/frame 102 of the autonomous vehicle 100. In some embodiments, one or more portions of the roof region 106 may coincide with the respective region of the movable body/frame 102 of the autonomous vehicle 100. In some embodiments, one or more portions of the floor region 104 may coincide with the respective region of the movable body/frame 102 of the autonomous vehicle 100.

In some embodiments, the general structure of the interior component 101 may comprise a cross-sectional shape that is generally rectangular, square, circular, elliptical, irregular, or other such suitable cross-sectional shape as would be appreciated by a skilled artisan upon reading the present disclosure, where the cross-section is taken along the x-y plane defined in FIGS. 1A-1B.

In some embodiments, the sidewall region 108 of the interior compartment 101 may be a single unit/wall, or comprise one or more (e.g., 2, 3, 4, 5, 6, 7, 8, etc.) discrete units/walls. For instance, the sidewall region 108 of the interior compartment in FIG. 1A may be considered to comprise four separate walls, especially in instances, e.g., where the interior compartment 101 comprises a generally rectangular, square, echelon, etc. cross-sectional shape. However, in some embodiments, the sidewall region 108 of the interior compartment 101 may be considered to be comprised of a single wall, especially in instances, e.g., where the interior compartment 101 comprise a generally circular, elliptical or otherwise rounded shape.

While not shown in FIG. 1A, the autonomous vehicle 100 may comprise one or more additional interior compartments in addition to interior compartment 101. In some embodiments, these one or more additional interior compartments may each independently house the equipment necessary for movement of the autonomous vehicle 100 (e.g., internal combustion engine and/or electric motor and components associated therewith), steering equipment (e.g., steering wheel), acceleration and deceleration components (e.g., a gas and brake pedal), extra seating, and/or an extra storage area (such as trunk compartment).

As discussed in greater detail below, the at least one interior compartment 101 described with reference to FIG. 1A-1B, may comprise a variety of components located therein. Such components may not be present and/or capable of being arranged or utilized, as disclosed herein, within the interior compartments of conventional vehicles.

As shown in the simplified schematic of FIG. 1B, the at least one interior compartment 101 may comprise at least one table 110. In some embodiments, the at least one table 110 may comprise a table top 112, and at least one leg 114 connected thereto and extending toward the floor region 104 of the interior compartment 101.

In some embodiments, the upper surface 116 of the table top 112 may be substantially flat. In some embodiments, one or more portions of the upper surface 116 of the table top 112 may be raised relative to other portions of the upper surface 116.

In some embodiments, such as shown, e.g., in FIG. 1B, the at least one table 110 may comprise a single leg 114. In some embodiments, the single leg 114 may be positioned substantially in a center area of the table 110. In some embodiments, the cross-sectional area of the single leg 114 may be about equal to or less than the cross-sectional area of the table 110, wherein the cross-sectional area is measured within the x-y plane of FIGS. 1A-1B.

In some embodiments, the height, as measured along the y-axis of FIGS. 1A-1B, of the at least one table 110 may be adjustable. By way of example, the height of the table 110 may be adjustable in instances where the at least one leg 114 of the table 110 comprises a pair of telescoping elements having an inner element configured to fit within and move relative to an outer sleeve element. The height of the table 110 may be secured via use of a locking pin placed through complimentary holes in the inner and outer sleeve elements of the leg 114, or by other such suitable locking mechanism as known in the art.

In some embodiments, the at least one leg 114 of the table 110 may optionally comprise one or more storage areas 116 (e.g., hollow areas) therein. In some embodiments, each of the storage areas 116 may independently be in the form of a drawer configured to slide between an open and closed configuration. In some embodiments, at least one of the storage areas 116 may be accessible via a door configured to slide, or extend outward or inward, between a closed and open configuration. In some embodiments, at least one portion of the table top 112 of the table 110 may be pivotally coupled to one or more portions of the at least one leg 114, thereby allowing the table top 112 to be raised and lowered between an open and closed configuration to allow access to the one or more storage spaces 114. In some embodiments, at least one of the storage areas 116 may be open to the interior compartment 101, and optionally comprise one or more restraining mechanisms (e.g., one or more bars, rods, a mesh net, etc.) configured to restrain movement of items stored therein.

It is of note that the at least one table 110 is not limited to a single leg 114. In some embodiments, the at least one table 110 may comprise two or more (e.g., 2, 3, 4, 5, 6, 6, 8, etc.) legs 114, each of which may independently and optionally comprise a storage area 116, as described herein.

In some embodiments, the outer periphery of the table top 112 of the at least one table 110 may be substantially oval shaped, e.g., as shown in FIG. 1B, or have any suitable shape including, but not limited to, a circle, square, rectangle, triangle, star, echelon, hexagon, octagon, an irregular shape, etc.

In some embodiments, the at least one table 110 may be a standalone unit, and not in contact with and/or attached to any portion of the sidewall region 108 of the interior compartment 101. For instance, as shown in the embodiment of FIG. 1B, the at least one table 110 may be positioned at or near the center area of the interior compartment 101, and attached to the floor region 104 of the interior compartment 101 via the at least one leg 114 of the table 110. In some embodiments, however, the at least one table 110 may be adjacent to, in contact with, and/or attached to a portion of the sidewall region 108 of the interior compartment 101.

In some embodiments, the at least one table 110 may be a removable unit, thereby allowing the table 110 to be removed and/or relocated if desired. In some embodiments, the at least one table 110 may be permanently affixed at a desired location within the interior compartment 101.

In some embodiments, one or more portions of the tabletop 110 of the at least one table 110 may be configured to fold, e.g., move from a substantially horizontal configuration to a substantially vertical configuration. In some embodiments, an entirety of the tabletop 110 may be configured to fold.

In some embodiments, the interior compartment 101 may comprise two or more (e.g., 2, 3, 4, 5, 6, 7, 8, etc.) tables 110, as described herein.

As also shown in FIG. 1B, the interior compartment 101 may optionally comprise at least one seating component 118. In some embodiments, the at least one seating component 118 may be located adjacent to the at least one table 110, and optionally surround one or more portions thereof. In some embodiments, such as shown, e.g., in FIG. 1B, the at least one seating component 118 may be a single component (e.g., be a single, molded component), optionally arranged in a general U-shape about the at least one table 110.

In some embodiments, the at least one seating component 118 may optionally comprise one or more storage areas (e.g., hollow areas) 118 therebeneath. In some embodiments, the one or more storage areas 120 may each comprise a front surface 122 in spaced relation to a back surface (not shown), wherein said front and back surfaces each extend from the seating component 118 toward the floor region 104 of the interior compartment 101. In some embodiments, at least one of the storage areas 120 may be in the form of a drawer configured to slide between an open and closed configuration. In some embodiments, at least one of the one storage areas 120 may be accessible via a door located in at least a portion of the front surface 122, wherein said door is configured to slide, or open inward or outward, between an open and closed configuration. In some embodiments, at least one of the storage areas 120 may be open to the interior compartment 101, and optionally comprise one or more restraining mechanisms (e.g., one or more bars, rods, a mesh net, etc.) configured to restrain movement of items stored therein. In some embodiments, one or more portions of the at least one seating component 118 may be pivotally coupled to one or more front surfaces 122 of the storage areas 120, or to one or more back surfaces of the storage areas 118, to allow access thereto.

The at least one seating component 118 may have a first upper surface 124 upon which an individual may sit. In some embodiments, one or more portions of the first upper surface 124 of the seating component 118 may comprise padding or a cushion-like material for comfort.

In some embodiments, one or more portions of the first upper surface 124 of the at least one seating component 118 may further comprise a back portion 126 extending substantially vertically therefrom. In some embodiments, one or more portions of the back portion 126 may also comprise padding or a cushion-like material for comfort. In some embodiments, one or more portions of the back portion 126 may, or may not, vertically coincide with the back surfaces of the storage area(s) 118.

In some embodiments, one or more portions of the back portion 126 of the at least one seating component 118 may coincide with one or more portions of the sidewall region 108 of the interior compartment 101 (see, e.g., areas 128). In some embodiments, one or more portions of the back portion 126 of the at least one seating component 118 may comprise a second upper surface 130 extending in a substantially horizontal direction therefrom. In some embodiments, the second upper surface 130 may extend between the back portion 126 and one or more portions of the of the sidewall region 108 of the interior compartment 101. The second upper surface 130 may provide an additional area on which to place and/or store items.

In some embodiments, the at least one seating component 118 may be removable, thereby allowing the removal and/or relocation thereof. In some embodiments, the at least one seating component 118 may be permanently affixed at a desired location within the interior compartment 101.

In some embodiments, the at least one seating component 118 may be comprised of a plurality of individual seating units. In some embodiments, each individual seating unit may be located adjacent to the at least one table 110. In some embodiments, the individual seating units may further surround one or more portions of the at least one table 110.

Moreover, each individual seating unit may comprise one or more of the features discussed in relation to the single seating component 118 of FIG. 1B. For instance, in some embodiments, each individual seat unit may independently comprise a storage area 120 therebeneath. In some embodiments, each individual seat unit may independently comprise padding or a cushion-like material on one or more portions of the first upper surface 124 thereof. In some embodiments, each individual seat unit may independently comprise a back portion 126, which may also optionally comprise padding or a cushion-like material on one or more portions thereof. In some embodiments, each individual seat unit may independently be removable or permanently affixed to a desired location within the interior compartment 101.

As additionally shown in FIG. 1B, the interior compartment 101 may optionally comprise at least one closet 132. In some embodiments, the at least one closet 132 may be adjacent to, in contact with, and/or attached to a portion of the sidewall region 108 of the interior compartment 101. In some embodiments, however, the closet 132 may be a standalone unit, and not in contact with and/or attached to any portion of the sidewall region 108 of the interior compartment 101.

In some embodiments, the at least one closet 132 may comprise one or more horizontal bars configured for hanging clothes. In some embodiments, the at least one closet 132 may further comprise one or more drawers and/or one or more shelves for additional clothes storage. In some embodiments, the at least one closet 132 may comprise one or more doors enclosing the interior space thereof. In some embodiments, however, the at least In some embodiments, the height of the at least one closet 132 may be about extend the about the full height of the interior compartment 101. In some embodiments, the height of the at least one closet 132 may extend less than the full height of the interior compartment 101. In some embodiments, the at least one closet 132 may be from about 20% to about 100% of the height of the interior compartment 101. In the embodiment of FIG. 1B, the at least one closet 132 may be coupled to the second upper surface 132 of the at least one seating component 118.

As further shown in FIG. 1B, the interior compartment 101 may optionally comprise a vanity component 134. In some embodiments, the vanity component 134 may comprise an open storage type area in which cosmetics, toiletries, and other such items may be placed. In the embodiment of FIG. 1B, the vanity component 134 may comprise a recessed storage type area located, for example, in the second upper surface 130 of the at least one seating component 118. In some embodiments, the vanity component 134 may be configured as a second table.

In some embodiments, the vanity component 134 may also comprise a mirror 136. The mirror 136, in some embodiments, may be coupled to a portion of the sidewall region 108 of the interior compartment 101. In some embodiments, the mirror 136 may be coupled to a window of the interior compartment 101.

As also shown in FIG. 1B, one or more shelves 138 may be attached to the sidewall region 108 of the interior compartment 101. In some embodiments, at least one of the shelves 138 may comprise one or more restraining mechanisms (e.g., one or more bars, rods, a mesh net, etc.) configured to restrain movement of items stored thereon. In some embodiments, at least one of the shelves 138 may be enclosed so as to prevent items placed therein from sliding off said shelves. In embodiments in which at least one of the shelves 138 is enclosed, the interior thereof may be accessible via a drawer configured to slide between an open and closed configuration, or a door configured to slide, or open inward or outward, between an open and closed configuration.

While not shown in FIG. 1B, in some embodiments, one or more buttons may be coupled to any of the components of the interior compartment 101 disclosed herein (e.g., the at least one table 110 and/or the at least one seating component 118), where the buttons may independently control predetermined operation modes of the autonomous vehicle. For instance, With continued reference to FIG. 1B, the interior compartment 101 may also comprise one or more windows 140 on one or more portions of the sidewall region 108 thereof, in some embodiments. Each of the windows 140 may independently provide a view of the outside environment, or a view of another interior compartment of the autonomous vehicle in instances where said window serves as a divider between interior compartments. In some embodiments, each of the windows 140 may independently be configured to transition between a substantially transparent state to a substantially opaque state. A passenger in the autonomous vehicle may wish to place the windows 140 in a substantially opaque state for privacy reasons, such as when changing clothes, sleeping, etc. In some embodiments, the windows 140 may comprise electrochromic, photochromic, thermochromic, suspended particle, micro-bling, and polymer-dispersed liquid crystal materials to effectuate the transition between a substantially transparent state to a substantially opaque state.

In some embodiments, at least one of the windows may serve as the windshield of the autonomous vehicle 100.

In some embodiments, at least one of the windows 140 may also be configured to operate as a screen on which to display data. Such data may include navigation information, e.g., information related to a current travel route, time of arrival to destination, location of the autonomous vehicle in real time, street view images of the travel route in real time, current and upcoming road conditions, current traffic information, weather information, road construction information, and the like. It may be particularly advantageous for the time of arrival to a desired destination to be displayed in instances where a passenger in the autonomous vehicle is in the process of changing clothes, utilizing the vanity component 134, eating, etc. In some embodiments, the navigation information may be collected via a navigation system associated with the autonomous vehicle. In some embodiments, the navigation system may utilize information collected via a Global Positioning System (GPS) component, at least one sensor, radar, at least one laser scanner, and/or other communication systems couple to the autonomous vehicle. In some embodiments, the navigation system may also utilize information received from third party service providers.

Data able to be displayed on the aforementioned screen may also include information related to social media, current events, alerts, content capable of being sent (or streamed) from mobile phones and/or computing devices (e.g., photographs, videos, web content, movies, television shows, music, etc.), and/or information related to the driving mode in which the autonomous vehicle is operating (discussed in greater detail later).

In some embodiments, different types or formats of the data described herein may be displayed simultaneously on the aforementioned screen. The different type or formats of the data may also, in some embodiments, be simultaneously displayed in one or more different regions of the screen. For example, data relating to the time or arrival may be displayed in one portion of the screen, data relating to the travel route may be displayed in another portion of the screen, and social media information may be displayed in yet another portion of the screen. For example, FIG. 1B shows a detailed view of a window 140 comprising a first portion 142 displaying data of time or arrival, a second portion 144 displaying data of the travel route, and a third portion 146 displaying social media information.

While not shown in FIG. 1B, the interior compartment 101 of the autonomous vehicle may comprise one or more additional components configured for the comfort and convenience of passengers traveling within the autonomous vehicle. These additional components may include, but are not limited to a sink, a kitchen area (e.g., comprising a refrigerator, oven, microwave, and/or stovetop, etc.), a lavatory (e.g., comprising a toilet and/or shower area, etc.), steering and equipment (e.g., a steering wheel), acceleration and deceleration components (e.g., a gas and brake pedal), and other such components as would become apparent to a skilled artisan upon reading the present disclosure.

It is again of note that the interior compartment is not limited to the components or arrangement thereof illustrated in FIG. 1B. Rather, the interior compartment 101 of the autonomous vehicle 100 may include any combination of the components described herein, as well as any desired arrangement thereof.

In some embodiments, for example, the interior compartment 101 of the autonomous vehicle 100 may include steering equipment (e.g., a steering wheel) to enable a passenger to steer the vehicle 100. In some embodiments, the interior compartment 101 of the autonomous vehicle 100 may include additionally include acceleration and deceleration components (e.g., a gas and brake pedal) to enable a passenger to accelerate and slow/stop the vehicle. In some embodiments, this steering equipment and/or the acceleration/deceleration components may be housed in an interior compartment separate from interior compartment 101. This separate interior compartment may further comprise one or more seats to enable a passenger to sit comfortably while operating the vehicle 100.

In some embodiments, the autonomous vehicle 100 may not have steering equipment and/or the acceleration/deceleration components, and thus not configured for real time human input insofar as driving operations are concerned.

In some embodiments, the autonomous vehicle 100 may also include one or more separate interior compartments for storage (such as a trunk space).

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Certain of the operations described herein may be implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 2:
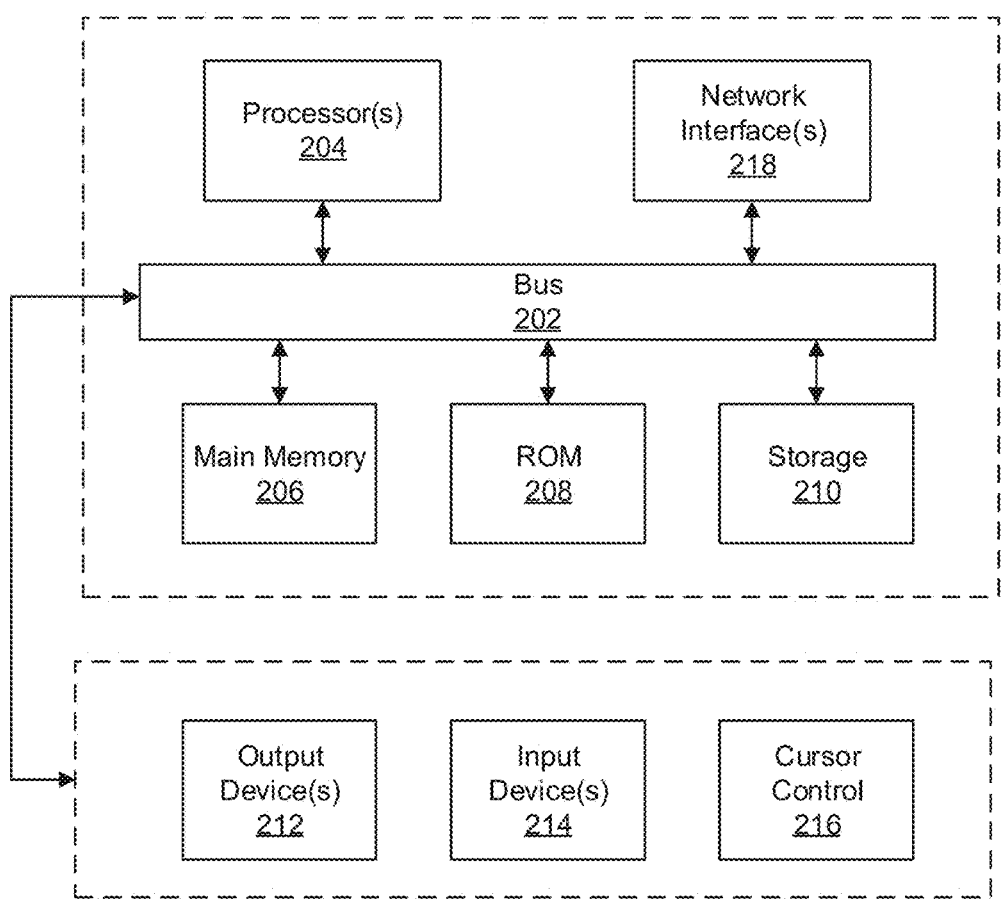
FIG. 2 is a block diagram that illustrates a computer system upon which applicable embodiments described herein may be implemented.

FIG. 2 is a block diagram that illustrates a computer system 200 upon which any of the embodiments described herein may be implemented. The computer system 200 includes a bus 202 or other communication mechanism for communicating information, one or more hardware processors 204 coupled with bus 202 for processing information. Hardware processor(s) 204 may be, for example, one or more general purpose microprocessors.

The computer system 200 also includes a main memory 206, such as a random access memory (RAM), cache and/or other dynamic storage devices, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

The computer system 200 further includes a read only memory (ROM) 208 or other static storage device coupled to bus 202 for storing static information and instructions for processor 204. A storage device 210, such as a magnetic disk, optical disk, or USB thumb drive (Flash drive), etc., is provided and coupled to bus 202 for storing information and instructions.

The computer system 200 may be coupled via bus 202 to output device(s) 212, such as a cathode ray tube (CRT) or LCD display (or touch screen), for displaying information to a computer user. Input device(s) 214, including alphanumeric and other keys, are coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 200 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor(s) 204 executing one or more sequences of one or more instructions contained in main memory 206. Such instructions may be read into main memory 206 from another storage medium, such as storage device 210. Execution of the sequences of instructions contained in main memory 206 causes processor(s) 204 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 210. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may retrieves and executes the instructions. The instructions received by main memory 206 may optionally be stored on storage device 210 either before or after execution by processor 204.

The computer system 200 also includes a communication interface 218 coupled to bus 202. Communication interface 218 provides a two-way data communication coupling to one or more network links that are connected to one or more local networks. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN (or WAN component to communicated with a WAN). Wireless links may also be implemented. In any such implementation, communication interface 218 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 218, which carry the digital data to and from computer system 200, are example forms of transmission media.

The computer system 200 can send messages and receive data, including program code, through the network(s), network link and communication interface 218. In the Internet example, a server might transmit a requested code for an application program through the Internet, the ISP, the local network and the communication interface 218.

The received code may be executed by processor 204 as it is received, and/or stored in storage device 210, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A vehicle comprising at least one interior compartment, wherein the interior compartment comprises:
   a table;
   a seating unit;
   a closet;
   a window;
   a vanity comprising a recessed storage area disposed in an upper surface of the seating component; and
   a storage area,
   wherein the vehicle comprises one or more hardware processors including a circuit configured to:
   operate the vehicle in a first autonomous mode, a second autonomous mode, and an emergency mode;
   switch the vehicle, in response to a user input, from the first autonomous mode to the second autonomous mode, the second autonomous mode comprising adjusting a speed of the vehicle and selecting a road based on a type, a trajectory, a condition, and a lane of the road to minimize a disturbance to a passenger eating, dressing, or sleeping; and
   switch the vehicle, in response to detecting an emergency situation, from the first autonomous mode to the emergency mode, wherein the vehicle diverts away from a location of the emergency situation.

2. The vehicle of claim 1, wherein the vehicle does not comprise a steering wheel.

3. The vehicle of claim 1, wherein the vehicle does not comprise an acceleration pedal or a brake pedal.

4. The vehicle of claim 1, wherein the window is configured to transition between a substantially transparent state and a substantially opaque state.

5. The vehicle of claim 1, wherein the window is configured to display information on at least a portion thereof, wherein the information comprises navigational information.

6. The vehicle of claim 5, wherein the navigational information comprises a time of arrival to a destination, a suggested route to the destination, current traffic information, or current road condition information, or combinations thereof.

7. The vehicle of claim 5, wherein the information comprises social media content.

8. The vehicle of claim 1, wherein the vehicle is further configured to operate in a manual mode.

9. The vehicle of claim 1, wherein the vehicle is further configured to operate in an emergency mode.

10. The vehicle of claim 1, wherein the window comprises a first portion to display data of an arrival time, a second portion to display data of a travel route, and a third portion to display social media information.

* * * * *